May 4, 1926.

F. R. McGEE

FLEXIBLE COUPLING

Filed May 2, 1924

Witnesses:
Edwin Trueb

Inventor:
FRANK R. McGEE,
By D. Anthony Usina
his Attorney.

May 4, 1926.

F. R. McGEE 1,582,997

FLEXIBLE COUPLING

Filed May 2, 1924

Witnesses:
Edwin Trueb

Inventor:
FRANK R. McGEE,
by D. Anthony Usina
his Attorney.

Patented May 4, 1926.

1,582,997

UNITED STATES PATENT OFFICE.

FRANK R. McGEE, OF STEUBENVILLE, OHIO.

FLEXIBLE COUPLING.

Application filed May 2, 1924. Serial No. 710,546.

*To all whom it may concern:*

Be it known that I, FRANK R. McGEE, a citizen of the United States, and resident of Steubenville, in the county of Jefferson and State of Ohio, have invented certain new and useful Improvements in Flexible Couplings, of which the following is a specification.

This invention relates to flexible couplings used to connect the contiguous ends of rotary shafts or spindles, and has for one of its objects the provision of a coupling of this class that will be more compact than those heretofore devised.

Another object is to provide a coupling having a driving box or shell, which is split on a line parallel to the longitudinal axis of the coupled shafts forming two parts, thereby facilitating assembling and dismantling in locations where the end travel is limited.

A further object is to provide a coupling of this class having means for preventing the chattering of its parts when starting or reversing the rotation of the shafts.

A still further object is to provide a coupling having the novel construction, design, and combination of parts described in the following specification and illustrated in the accompanying drawings.

In the drawings, Figure 1 is a longitudinal sectional elevation through a coupling embodying my invention.

Figure 1:
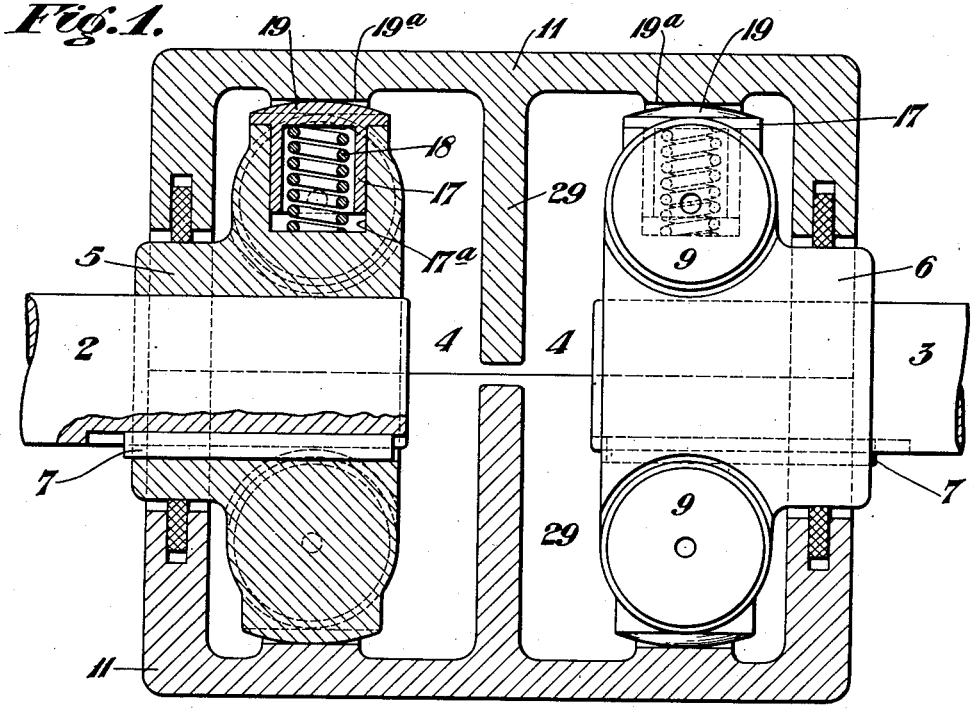
Figure 2:
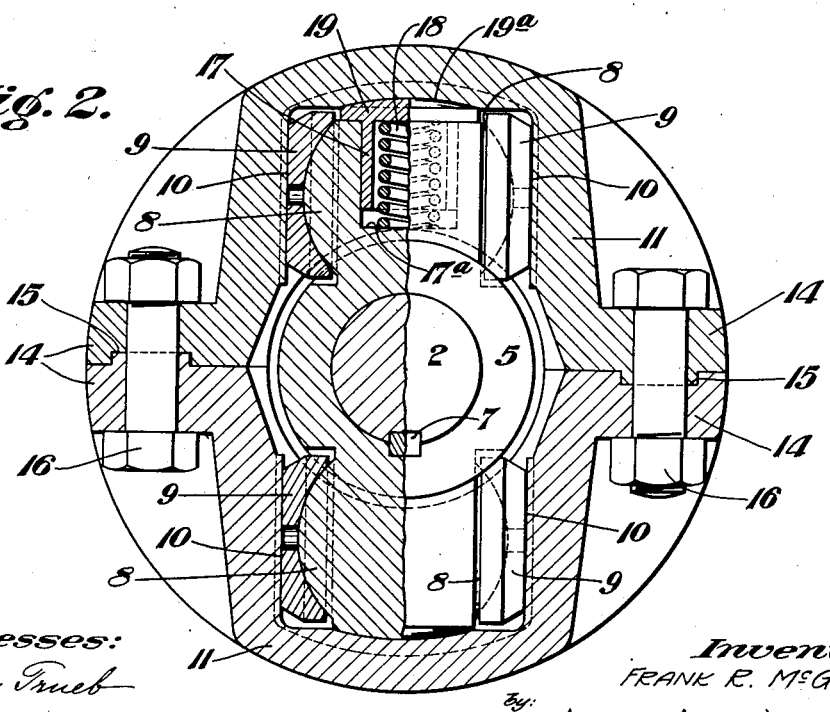
Figure 2 is a transverse sectional elevation through the same.

Referring more particularly to the drawings, the numerals 2 and 3 designate the coupled shafts, one being the driven and the other the driving shaft. Mounted on the adjacent ends of the shafts 2 and 3, which are spaced apart to form spaces 4 for operating clearance, are cross heads 5 and 6, respectively. The cross heads 5 and 6 are keyed to the shafts by keys 7 and are provided with convex projections 8 on two opposite sides, which fit snugly within the inner concave faces of co-operating washer members 9, whose outside faces are flat and bear against machined bearing portions 10 of an enclosing driving box 11 which surrounds the cross heads 5 and 6.

The driving box 11 is split on a line parallel with the longitudinal axis of the shafts, forming a two part box. Each part of the box 11 is provided with outwardly extending attaching flanges 14, which are machined to form a tongue and groove joint 15, thus removing all shearing and twisting stresses from the flange attaching bolts 16.

The driving box 11 is supported in position by spring pressed plungers 17 mounted in recesses 17$^a$ formed in the sides of said cross heads, which extend at right angles to the sides in contact with the washers 9. The plungers 17 have a hollow stem portion extending within the recess 17$^a$, and a coil spring 18 is mounted within said stem and bears against the bottom of the recess and top 19 of the plunger, so as to be normally under pressure. The compressive strength of the springs 18 is more than sufficient to support the weight of the coupling box 11 without deflection. The tops 19 of the plungers 17 have spherical bearing faces which bear against a machined surface 19$^a$ in the coupling box 11, thus permitting uniform contact with the coupling box regardless of misalinement of the shafts 2 and 3, and consequent change in relative positions of the cross heads 5 and 6.

Figure 3:
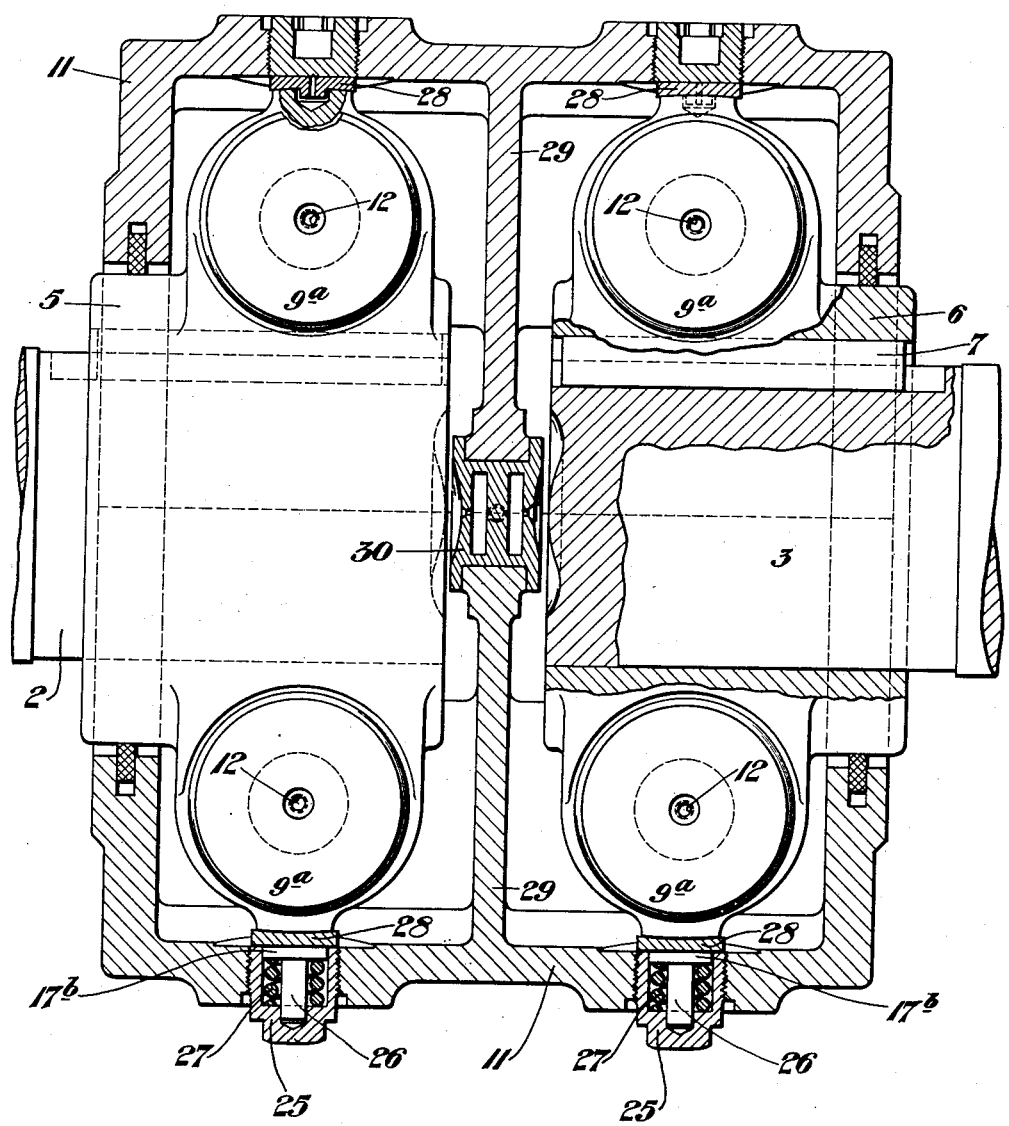
Figure 3 is a longitudinal sectional elevation through a coupling embodying my invention, in a slightly modified form.
Figure 4:
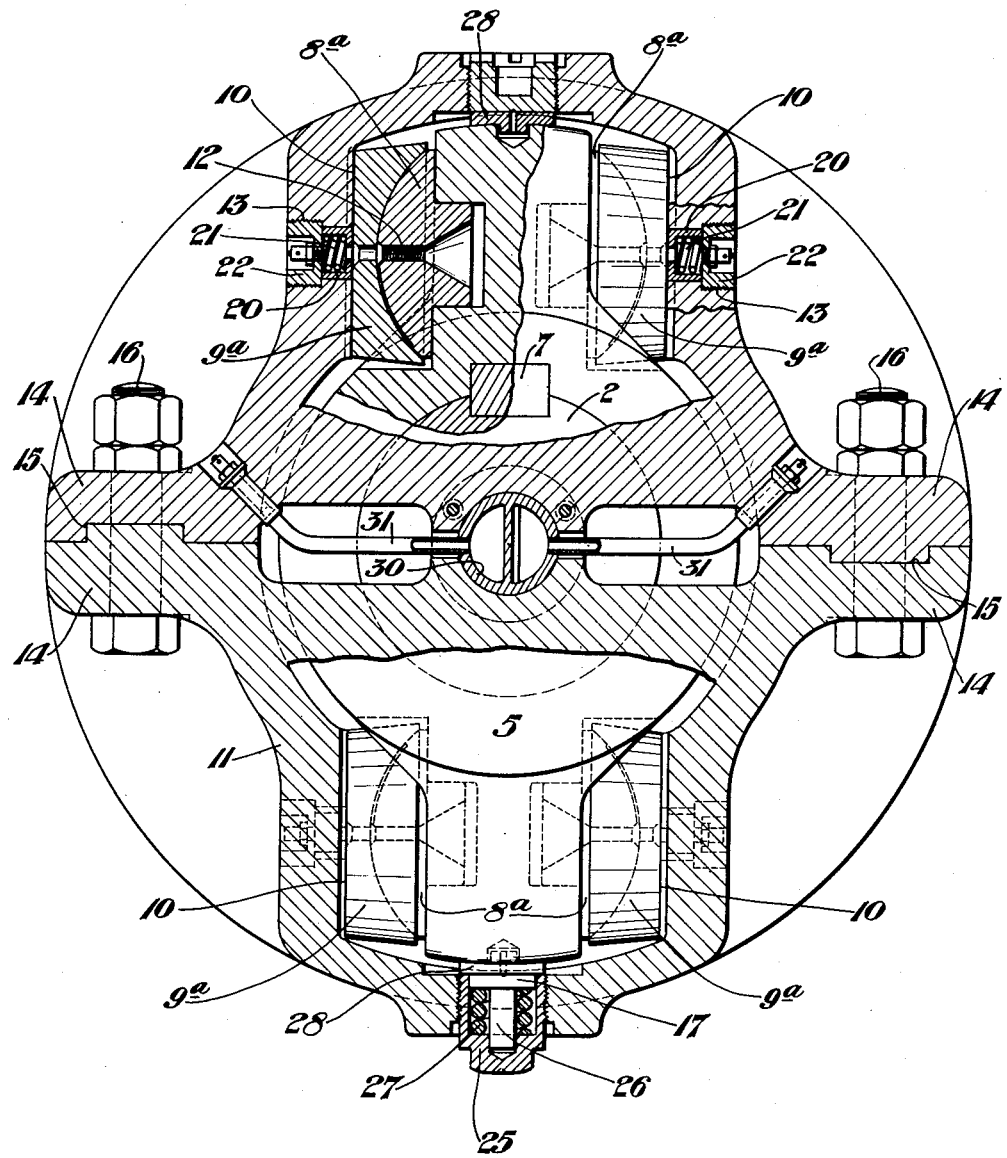
Figure 4 is a transverse sectional elevation through the coupling of Figure 3.

In Figures 3 and 4 I have shown a slightly modified form of coupling. The same reference numerals will be used to designate parts of this coupling, which are the same as the parts of the coupling heretofore described. In this modified form of coupling the shafts 2 and 3 are provided with cross heads 5 and 6 as in the preferred form. However, the cross heads 5 and 6 are provided with recesses in which are mounted convex washers 8$^a$ instead of the convex projections 8 of the preferred form. The convex faces of the washers 8$^a$ fit snugly within the inner concave faces of co-operating washers 9$^a$, whose outside faces are flat and bear against machined bearing portions 10 of the enclosing casing 11, which surrounds the cross heads 5 and 6 as in the preferred form.

To facilitate assembling in the driving box, the washers 8$^a$ and 9$^a$ are drilled and tapped as at 12 for the reception of a screw (not shown), so that the washers may be held in position during the assembling operation. When the parts are assembled, the screws are removed from the apertures 12 through the spring plunger apertures 13 formed in the driving box 11.

After the coupling has been assembled and the box 11 bolted in position, the assembly screws will be removed from the washers 8ª and 9ª through the plunger apertures 13, and spring plungers 20 supported by springs 21 will be inserted in the apertures 13 and bear against the washers 9ª. The plungers 20 and springs 21 are held in position and the springs under compression by oil or grease plugs 22, which are threaded into the apertures 13 and bear against the springs 21. The plungers 20 and springs 21 serve to force the washers 8ª and 9ª into close and true bearing contact and serve to lessen the chattering upon starting or reversing the rotation of the shafts.

The box 11 is supported in position by spring pressed plungers 17ᵇ mounted in hollow caps 25 threaded into suitable openings in the box 11. The plungers 17ᵇ are provided with stem portions 26 around which are mounted coil springs 27, one end of which bears against the plunger head and the other end of which bears against the cap 25. The heads of the plungers are adapted to engage a suitable spherical faced washer 28, which in turn bears against a convex spherical face of the cross heads. The compression strength of the springs 27 is adapted to be more than sufficient to support the weight of the coupling box 11, and such compression strength may be adjusted by simply turning the plugs or caps 25 in or out, as desired.

The plungers 17ᵇ and springs 27 operate for the same purpose as the plungers 17 and springs 18, namely, to flexibly support the box 11 and prevent chattering when starting or reversing the direction of rotation of the shafts 2 and 3. In the modified form, the plungers 20 and springs 21 also serve to hold the parts in firm engagement and, therefore, reduce the chattering when starting or reversing the shafts.

The box 11 in each of the above described constructions is stiffened by internal stiffening ribs or flanges 29. The ribs 29 of the box 11 in the modified form of Figures 3 and 4 are provided with offsets so as to form a seat for a thrust box 30 adapted to be engaged by the ends of the shafts 2 and 3. The box 30 also serves as a lubricant receptacle and oil or grease conduits 31, which extend through suitable openings in the box 11, are connected therewith, so as to provide for supplying lubricant thereto.

The operation and advantages of these improved couplings will be readily understood. The drive connection between the box and shafts formed by the engagement of the convex and concave faced members will provide for a limited universal movement between the shafts. The flexible support formed by the spring pressed plungers will prevent chattering when starting or reversing the rotation of the shafts. The apparatus is simple and will not require frequent repairs. The mechanism of the coupling is provided outside of the shaft diameter instead of between the shaft ends, thereby eliminating the necessity of spacing the shaft ends a distance sufficient to receive said mechanism, as is the common practice. The driving casing is split on a line parallel with the longitudinal axis of the shafts, thus facilitating the assembling and dismantling of the coupling in locations where end travel is limited.

It will be expressly understood that while I have described and illustrated with great particularity certain embodiments of my invention, I do not wish to be limited thereto, since various other modifications may be made without departing from the scope of my invention as defined in the appended claims.

I claim—

1. The combination with two shafts arranged in substantial alinement and having their abutting ends in close proximity to each other, of means for flexibly coupling said shafts to each other, said means comprising a cross head secured to each of said shafts adjacent their abutting ends, a driving box mounted around said cross heads, means mounted between two opposite sides of said box and said cross heads to form a driving connection therewith, said means permitting a limited universal movement of said shafts and cross heads relative to said box, and resilient means for forming a flexible connection between the other two sides of said cross heads and said box to prevent chattering when starting or reversing the shafts.

2. The combination with two shafts arranged in substantial alinement and having their abutting ends in close proximity to each other, of means for flexibly coupling said shafts to each other, said means comprising a cross head secured to each of said shafts adjacent their abutting ends, a driving box mounted around said cross heads, means mounted between two opposite sides of said box and said cross heads to form a driving connection therewith, said means permitting a limited universal movement of said shafts and cross heads relative to said box, and spring pressed plungers for forming a flexible connection between the ends of said cross heads and said box to prevent chattering when starting or reversing the shafts.

3. The combination with two shafts arranged in substantial alinement and having their abutting ends in close proximity to each other, of means for flexibly coupling said shafts to each other, said means comprising a cross head secured to each of said shafts adjacent their abutting ends, a two piece driving box mounted around said cross heads, said box being split transversely on a line with the longitudinal axis of said shafts, and means mounted between two opposite sides of said box and said cross heads to form a driving connection therewith, said means permitting a limited universal movement of said shafts and cross heads relative to said box, a spring pressed plunger mounted in a suitable recess in each of the other two side faces of said cross heads, said plungers each being provided with a spherical head portion adapted to engage a machined surface on said box, thereby permitting uniform contact with said box and preventing chattering when starting or reversing the shafts.

In testimony whereof I have hereunto set my hand.

FRANK R. McGEE.